United States Patent [19]
Hibler, Sr.

[11] Patent Number: 4,629,861
[45] Date of Patent: Dec. 16, 1986

[54] METHOD OF AFFIXING AN ALUMINUM RUPTURE DISC ASSEMBLY TO AN ALUMINUM CASTING

[75] Inventor: Donald R. Hibler, Sr., Bates City, Mo.

[73] Assignee: Fike Metal Products Corporation, Blue Springs, Mo.

[21] Appl. No.: 808,850

[22] Filed: Dec. 13, 1985

[51] Int. Cl.$^4$ .............................................. B23K 9/00
[52] U.S. Cl. .................................. 219/137 R; 361/385
[58] Field of Search ...................... 219/137 R; 361/385

[56] References Cited

U.S. PATENT DOCUMENTS 3,458,683  7/1969  Canonico et al. ..................... 219/118
4,331,830  5/1982  Conway et al. ....................... 361/385

OTHER PUBLICATIONS

IBM Technical Disclosure Bulletin, Councill et al, "Temperature-Controlled Immersed Cooling System", vol. 11, No. 9, Feb. 1969.

Primary Examiner—E. A. Goldberg
Assistant Examiner—Lincoln D. Donovan

[57] ABSTRACT

A method of affixing an aluminum rupture disc assembly to a 356 aluminum alloy heat-treated aluminum casting is disclosed wherein the rupture disc is of 1100 aluminum alloy, the disc is welded to a tubular member of 2219 aluminum alloy which in turn is fillet welded to the 356 aluminum alloy casting using a 4145 aluminum alloy rod. The disc is welded to the support member by an electro beam or TIG process while fillet welding of the support member to the 356 aluminum alloy casting is preferably accomplished by a TIG method. The procedure allows a rupture disc assembly to be mounted on a 356 aluminum alloy electronic housing unit which contains components cooled by a gaseous medium without adversely affecting the physical characteristics of the rupture disc, the support member therefor, or the cast housing.

20 Claims, 4 Drawing Figures

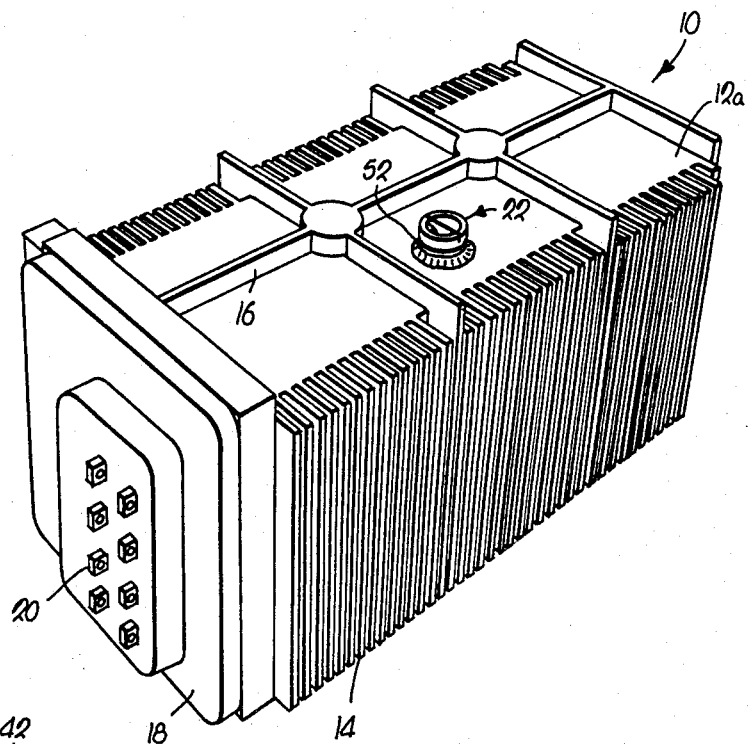
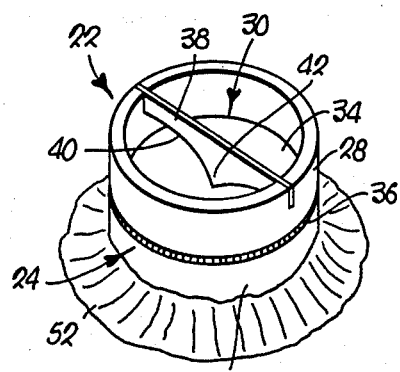
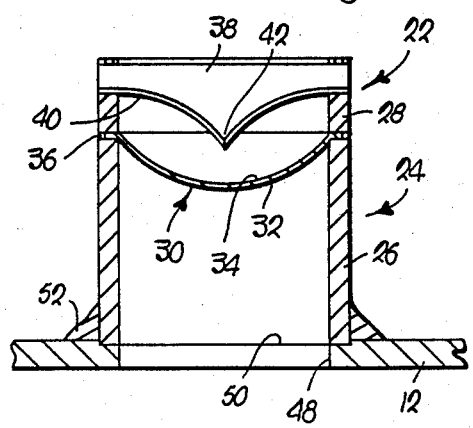
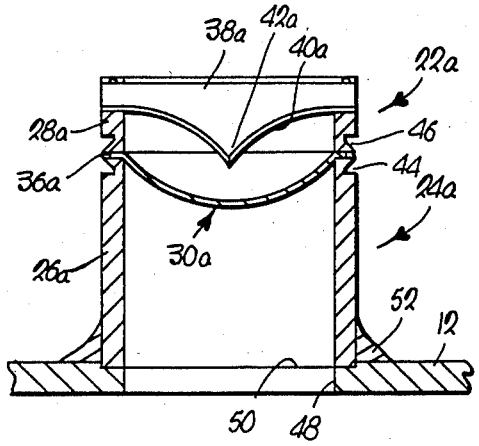

METHOD OF AFFIXING AN ALUMINUM RUPTURE DISC ASSEMBLY TO AN ALUMINUM CASTING

BACKGROUND OF THE INVENTION

1. Field of the Invention

Lightweight units especially suited for housing electronic components capable of handling relatively large electrical loads desirably are cast of aluminum so that cooling fins may be made an integral part of the unit. The provision of reinforcing ribs, cooling fins and other internal or external integral protrusions dictates use of sand casting procedures in manufacture of housings of this general type for cost and structural integrity purposes. Furthermore, these units which may for example have width, height and length dimensions of the order of two or three feet or more. As a result, and in view of the desirability of sand casting fabrication, 356 aluminum alloy is generally used for such purposes.

In instances where the sand cast 356 aluminum alloy housing is used for electronic or electrical components which generate heat, it is conventional to provide a cooling medium within the interior of the housing and often comprising a fluid such as freon or the like under pressure. When excessive heat is generated in the interior of the housing, it is necessary to relieve such pressure in order to prevent catastrophic rupture of the 356 sand cast aluminum alloy housing. Efforts to provide relief valves have not heretofore been entirely successful. On the other hand though, incorporation of rupture discs in vent openings in the 356 aluminum alloy sand cast housing units has not been successfully accomplished because of the difficulty of securing the rupture disc in a relief vent in the housing without adverse effects on the physical properties of the rupture disc and particularly the burst pressure thereof.

The pressure relief cannot be provided by utilization of a rupture disc carried by a tubular assembly which is simply threaded into an opening therefor in the housing because of the fact that such threaded connection does not provide a truly hermetic seal which assures retention of the cooling medium in the housing. Relief valves suffer from the same disability. Therefore, a true hermetic seal can be provided only be welding of the rupture disc assembly to the housing unit.

2. Description of the Prior Art

Efforts to weld rupture disc assemblies to 356 aluminum alloy, heat-treated, sand cast units such as housings for electronic or electrical components which dissipate heat and therefore require a cooling medium in surrounding relationship thereto, have heretofore been frustrated by the fact that impurities in the outer surface of the cast housing resulting from residual deposits of sand and other foreign matter have precluded welding of a rupture disc support to the body of the housing. In order to overcome the effect of the impurities at the surface of the cast body where welding was attempted, it was found necessary to introduce so much heat to the parts that damage occurred to the support for the disc and particularly the rupture disc itself, thus altering its burst characteristics and preventing provision of a disc that would reliably open at a pre-established pressure level.

When attempts were made to solve this problem by heat sinks or the like, then the integrity of the weld deteriorated to a point where a true hermetic seal was impossible to obtain.

SUMMARY OF THE INVENTION

It has now been discovered that a rupture disc assembly may be hermetically attached to a 356 alloy heat-treated aluminum sand casting body by utilization of 2219 aluminum alloy for the rupture disc support member and fillet welding of such support member to the sand cast body by a TIG process using 4145 aluminum alloy rod for generation of the fillet. Desirably, the rupture disc itself is fabricated of a dead soft, fully annealed aluminum alloy such as type 1100. Fillet welding is accomplished under a protective atmosphere comprising an admixture of argon and helium, preferably at a ratio of 12 parts of helium to 30 parts of argon.

BRIEF DESCRIPTION OF THE DRAWINGS

FIG. 1 is a perspective view of an electronic or electrical component housing ideally cast of an aluminum alloy such as type 356 and provided with pressure relief structure in the nature of a rupture disc assembly hermetically attached to the housing;

FIG. 2 is an enlarged, perspective showing of the rupture disc assembly which is fillet welded to the wall of the sand cast housing;

FIG. 3 is an enlarged, vertical crosssectional view of one type of rupture disc assembly hermetically attached to the sand cast housing by fillet welding; and FIG. 4 is an enlarged, vertical crosssectional view of an alternate embodiment of the rupture disc assembly fillet welded to the sand cast housing.

DETAILED DESCRIPTION OF THE INVENTION

FIG. 1 is a perspective view of a typical electronic or electrical component housing which finds industrial application in systems such as electrical or electro-diesel railway trains. Exemplary housings form a part of brake or control devices and have components therein which generate considerable thermal energy because of the electrical load carried by the circuitry. In order to dissipate this heat, it is conventional to fill the housing with a coolant such as freon or the like. Also, the housings are provided with integral cooling fins and internal and external protrusions and ribs which serve reinforcing as well as mounting functions, thereby complicating the external and internal configuration of the overall housing.

For cost considerations and ease of fabrication, it is conventional practice to fabricate housings of this type of aluminum alloys using sand casting techniques. The cost factors are especially important because these housings often are of dimensions such that the width, height and length are two to three feet or more and the walls have a thickness capable of withstanding significant pressures.

Given the need to sand cast the housings, desirably the units are constructed of 356 aluminum alloy which comprises 6.5% to 7.5% silicon, 0.6% iron, 0.25% copper, 0.35% manganese, 0.2% to 0.25% magnesium, 0.35% zinc, 0.25% titanium, 0.05% other elements, and the remainder aluminum. This aluminum alloy has been found to have the best properties for production of relatively large, thick walled sand castings which are used for housing of electrical components where heat is dissipated, and there is a need to provide a relatively complex inner and outer surface configuration to accomodate structural shapes such as cooling fins, reinforcing ribs, mounting bosses, component receptacles, board slots and similar designs. Furthermore, this aluminum alloy is available at a reasonable cost, has the necessary overall physical properties and lends itself to required heat treating for strength and non-detrimental brittleness. A preferred casting material is GA1Si7Mg wa DIN 17.25/2 (German specification) or 356 Al per ASTM B26 (U.S. specification).

However, because there is a need to provide for relief of pressure from the interior of electrical component housings sand cast from a 356 aluminum alloy, and relief valves and threaded rupture disc assemblies do not afford a hermetic seal, it is necessary to weld the relief device in a selected position in the sand cast housing wall.

The electrical components housing broadly designated 10 as illustrated in FIG. 1 is a hollow body sand cast of 356 aluminum alloy and heat treated to provide desirable strength and brittleness characteristics. The housing 10 has a wall 12 provided with integral side fins 14 and integral reinforcing ribs 16. In the form of the housing shown, the end cover 18 is removable for mounting of suitable electrical components therein and to that end, a series of terminals 20 project from the outer surface of the cover 18.

Since the components housed within the body 10 generate heat during operation of the electrical system connected thereto, such energy is dissipated to the walls of the housing by a suitable coolant such as freon. In view of the fact that the gaseous coolant can increase in pressure to a point where disastrous rupture or fragmentation of the components housing 10 may occur, it is necessary to provide pressure relief which will allow escape of the coolant gas at a selected overpressure condition.

The relief device for housing 10 desirably comprises a rupture disc assembly broadly designated 22 hermetically attached to the wall 12 of the housing 10. The tubular support member 24 of assembly 22 comprises includes a inner cylinder 26 and an outer cylinder 28. A prebulged rupture disc 30 having a convex face 32 and an opposed concave face 34 is provided with a circumscribing annular outer flange 36 which is located between adjacent circular margins of the cylinders 26 and 28. A knife blade 38 bisects cylinder 28 and has an inwardly directed sharpened double curved edge 40 presenting a knife point 42 in direct opposition to the concave face 34 of rupture disc 30. The knife blade 38 is strategically located such that upon reversing of disc 30, severing thereof across the width of such disc is assured.

The means of attachment of disc 30 to cylinders 26 and 28 of support member 24 may be accomplished by different welding techniques but preferably electron beam welding or a TIG (tungsten inert gas) process is employed for this purpose. FIG. 3 illustrates securing the disc 30 to cylinders 26 and 28 by electron beam welding; whereas in FIG. 4, the disc 30a is shown as being attached to cylinders 26a and 28a respectively by TIG welding. For this purpose, the outer walls surfaces of cylinders 26a and 28a have circumferentially extending, transversely angular grooves 44 and 46 in cylinders 26 and 28a respectively to prevent heat generated during welding of the flange 36a of disc 30a to cylinders 26a and 28a respectively being transmitted along the longitudinal length of the cylindrical elements of the tubular support 24a.

The rupture disc must open at a selected burst pressure which is relatively low compared with the atmosphere present within the interior of the electrical component housing 10. For example, such burst pressure may be of the order of 30 to 60 psig at 100° C. Thus, best results can be obtained by utilization of a fully annealed, dead soft aluminum alloy for fabrication of a rupture disc of desired characteristics; type 1100 aluminum alloy is suitable in this respect. Type 1100 has a minimum of 99% aluminum with the remainder being silicon (plus iron) of about 0.95%, copper 0.05% to 0.2%, manganese 0.05%, zinc 0.1% and other elements no more than about 0.05%.

Furthermore, the rupture disc 30 (30a) should be of relatively thin aluminum alloy stock in order to provide for rupture thereof at the desired 30 to 60 psig overpressure at 100° C. An exemplary disc in this respect which bursts at about 48 psig (100° C.) may have a thickness of about 0.002 inch to about 0.005 inch.

Given the desirability of utilizing type 1100 aluminum alloy for fabrication of the rupture disc 30, it has now been discovered that the preferred welding of the dead soft aluminum alloy rupture disc to an aluminum alloy support therefor without detrimental effect on the rupture disc changing its burst characteristics while assuring a hermetic seal can be carried out utilizing type 2219 aluminum alloy for fabrication of the tubular support. Type 2219 aluminum alloy has 0.2% silicon, 0.3% iron, 5.8% to 6.8% copper, 0.2% to 0.4% manganese, 0.02% magnesium, 0.1% zinc, 0.05% to 0.015% vanadium, 0.02% to 0.1% titanium, 0.05% other elements and the remainder aluminum. It is desirable as previously indicated, that the aluminum alloy rupture disc be welded to the support therefor and that such welding be accomplished without production of a fillet to minimize heat generation which could adversely affect the shape and burst characteristics of the dead soft, fully annealed aluminum alloy rupture disc. It has been found that by utilization of type 2219 aluminum alloy for fabrication of the tubular support for rupture disc 30 (30a), welding of the rupture disc to the support cylinders may be carried out with electron beam or TIG processes without generation of a fillet which could transmit deleterious amounts of heat through the support to the rupture disc.

After finding that the combination of an 1100 aluminum alloy rupture disc and 2219 aluminum alloy support member therefor gave the best combination of properties for welding of the disc to the support without adverse effects on the disc, it was then discovered that the support member 24 could be hermetically attached to the wall 12 of the housing 10 by fillet welding of the cylinder 26 to wall 12.

The wall 12 of housing 10 is provided with a circular aperture 48 of a diameter equal to the ID of tubular member 24. The outer face 12a of wall 12 has an annular counterbore 50 which complementally receives the innermost extremity of inner cylinder 26 of tubular support 24. The counterbore serves as an alignment surface for the rupture disc assembly 22 and also assists in the welding of tubular member 24 to the wall 12 of housing 10.

As previously pointed out, the sand casting process used to construct the wall 12 of housing 10 inherently results in sand, foreign materials and other adulterants being present in the outer face 12a of the housing wall 12. Efforts to weld an aluminum member to a sand cast 356 aluminum alloy body have heretofore been hindered by the fact that if the temperature of the mutually engaging aluminum components was raised to a sufficiently high level to provide an effective weld, such temperatures would adversely affect a dead soft fully annealed rupture disc manufactured of, for example, 1100 type aluminum alloy because of the proximity of such disc to the weld joint between the 356 aluminum alloy body and a support for the rupture disc. Welding of an aluminum alloy member to 356 type aluminum alloy sand castings required excessively high temperatures to assure removal of impurities which would interfere with the integrity of the weld and prevent formation of a leakproof hermetic seal.

This problem has now been overcome by the discovery that if the type 2219 aluminum alloy rupture disc support member is fillet welded to the sand cast type 356 aluminum alloy housing utilizing TIG welding processes incorporating 4145 aluminum alloy rod, a leakproof hermetic weld may be obtained without raising the temperature of the tubular support member for the rupture disc to a level that adversely affects the shape and burst pressure characteristics of a type 1100 aluminum alloy rupture disc. 4145 welding rod has 9.3% to 10.7% silicon, 0.8% iron, 3.3% to 4.7% copper, 0.15% manganese, 0.15% magnesium, 0.15% chromium, 0.2% zinc, 0.05% other elements, and the remainder aluminum.

Fillet welding is carried out in a manner such that the external, annular fillet 52 joining the inner margin of tubular support member cylinder 26 to the wall 12 of housing 10 is of a cross-sectional thickness approximately equal to that of the wall thickness of the cylinder 26.

Before insertion of the innermost end of cylinder 26 of tubular support member 24 in aperture 48, the counterbore 50 and the innermost end of cylinder 26 are first degreased with a solvent such as isopropyl alcohol or the equivalent. Next, the tubular member 24 is inserted in counterbore 50 and cylinder 26 either tack welded to wall 12, or an appropriate fixture provided that will assure firm affixation of the rupture disc assembly 22 to housing 10 throughout the welding process.

TIG welding may be carried out for example utilizing a Miller model 330 A BP welding machine operated in AC mode. The voltage and amperage should be adjusted by the welder during visual observation of the welding bead to assure that intimate admixture of the 2219, 356 and 4145 aluminum alloys in a molten state. In fillet welding of a 1¼ inch rupture disc assembly (effective diameter of rupture disc and internal diameter of tubular support 24), excellent results have been obtained utilizing a ⅛ inch diameter tungsten (2% THOR) electrode spaced from the weld joint about 1/16 inch. A shielding gas is flooded over the fillet bead as welding progresses preferably constituted of 30 parts of argon and 12 parts of helium. In this exemplary product, a fillet of the required cross-sectional thickness may be generated utilizing a 3/32 inch diameter type 4145 aluminum alloy welding rod (Alco-Tec Wire Company, Traverse City, Mich.).

The wall 12 of housing 10 in which rupture disc is to be mounted should preferably be disposed in a horizontal attitude during fillet welding of the tubular support member 24 to the outer face 12a of wall 12. In this manner, uniform distribution of the molten aluminum alloys is obtained and preparation of a uniform fillet is assured.

From the foregoing, it can be seen that the rupture disc is formed of annealed aluminum of relatively thin stock and has a silicon content substantially less than that of the 356 aluminum alloy used for sand casting of housing 10. In addition, the tubular support member 24 is fabricated of an aluminum alloy which also has a silicon content substantially less than the silicon content of the type 356 aluminum alloy. The welding rod used for generation of the fillet attaching tubular support member 24 to the wall 12 of housing 10 has a silicon content significantly greater than that of the 356 aluminum alloy. This relationship of silicon levels of the respective aluminum alloys is believed to have a salutory effect on non-fillet weldability of the rupture disc to the support member and fillet weldability of the support member to the sand cast aluminum housing. It can also be seen that the silicon content of the fillet is approximately 30% greater than that of the 356 aluminum alloy. Another factor in this respect is believed to be the utilization of aluminum alloys wherein the welding rod used for generation of the fillet has a copper content from about ⅛ to about ⅜ of the copper content of the support member.

I claim:

1. In a method of affixing an aluminum rupture disc assembly to a 356 alloy heat-treated aluminum sand casting body having an aperture and comprising the steps of:
   providing a tubular aluminum alloy rupture disc support member having a tubular passage;
   mounting an aluminum alloy rupture disc across the tubular passage through the support member;
   securing the rupture disc to the support member;
   positioning the support member on the aluminum alloy body within the aperture in disposition causing the rupture disc to seal the aperture; and
   securing the support member to the aluminum alloy body without adversely affecting the physical and chemical characteristics of the body, the support member or the disc,
   said disc being of annealed aluminum of relatively thin stock and having a silicon content substantially less than that of the 356 aluminum alloy,
   said support member also having a silicon content substantially less than that of the 356 aluminum alloy,
   the securing of the support member to the aluminum alloy body being accomplished by welding wherein a fillet is generated for joining the support member to the body in surrounding relationship to the latter at the zone of merger of the support member with the aluminum alloy body,
   said fillet being of aluminum alloy having a silicon content significantly greater than that of the 356 aluminum alloy.

2. A method as set forth in claim 1, wherein the step of securing the support member to the aluminum body with a fillet being produced for joining the support member to the body includes generation of a fillet having a copper content from about ⅛ to about ⅜ of the copper content of the support member.

3. A method as set forth in claim 1, wherein the silicon content of the fillet is approximately 30% greater than that of the 356 aluminum alloy.

4. A method as set forth in claim 1, wherein the support member is 2219 aluminum alloy.

5. A method as set forth in claim 1, wherein the rupture disc is 1100 aluminum alloy.

6. A method as set forth in claim 1, wherein the fillet is generated from 4145 aluminum alloy.

7. A method as set forth in claim 1, wherein generation of the fillet is accomplished by TIG welding.

8. A method as set forth in claim 1, wherein securing of the rupture disc to the support member is accomplished by electron beam welding.

9. A method as set forth in claim 1, wherein securing of the rupture disc to the support member is accomplished by TIG welding.

10. A method as set forth in claim 1, wherein the rupture disc is welded to the support member and the support member is thereafter fillet welded to the 356 aluminum alloy.

11. A method as set forth in claim 1, wherein the support member is fillet welded to the 356 aluminum alloy using an aluminum welding rod to generate said fillet by an electric arc shielded with a mixture of argon and helium.

12. A method as set forth in claim 11, wherein said mixture of argon and helium is in the ratio of about 30 parts of argon to 12 parts of helium.

13. A method as set forth in claim 1, wherein said support member is 2219 aluminum alloy and the fillet is generated using a 4145 aluminum welding rod having a diameter of about 3/32 inch.

14. A method as set forth in claim 1, wherein is included the step of generating a fillet weld between the support member and the 356 aluminum alloy body of a cross-sectional thickness approximately equal to the thickness of the support member.

15. A method as set forth in claim 1, wherein said rupture disc has a thickness of about 0.002 inch to about 0.005 inch.

16. A method as set forth in claim 1, wherein said rupture disc has a burst pressure of about 30 to 60 psig at 100° C.

17. A method as set forth in claim 1, wherein said rupture disc has a burst pressure of about 48 psig at 100° C.

18. A method as set forth in claim 1, wherein is included bulging the disc to provide opposed concave and convex surfaces, the disc being mounted in disposition such that the concave surface thereof faces toward the aperture in the 356 aluminum alloy body.

19. A method as set forth in claim 18, wherein is included provision of a knife in proximal relationship to the convex surface of the disc to assist in severing thereof during bursting of the rupture disc.

20. In a method of affixing an aluminum rupture disc assembly to a 356 alloy heat-treated aluminum sand casting body having a circular aperture and comprising the steps of:
providing a tubular aluminum alloy rupture disc support member, said member having a tubular passage of 2219 aluminum alloy;
mounting an aluminum alloy rupture disc of 1100 aluminum alloy across the tubular passage through the support member;
welding the rupture disc to the support member;
positioning the support member on the aluminum alloy body within the aperture in disposition causing the rupture disc to seal the aperture; and
welding the support member to the aluminum alloy body without adversely affecting the physical and chemical characteristics of the body, the support member or the disc,
welding of the support member to the aluminum alloy body being accomplished by generation of a fillet which joins the support member to the body in surrounding relationship to the latter at the zone of merger of the support member with the aluminum alloy body,
said fillet being of 4145 aluminum alloy.

* * * * *